INVENTOR
BOB O. EVANS
BY Peter R. Leal
AGENT

United States Patent Office 3,478,322

Patented Nov. 11, 1969

3,478,322

DATA PROCESSOR EMPLOYING ELECTRONICALLY CHANGEABLE CONTROL STORAGE

Bob O. Evans, Bethesda, Md., assignor to International Business Machines Corporation, Armonk, N.Y., a corporation of New York Filed May 23, 1967, Ser. No. 640,652

Int. Cl. G11b *13/00*

U.S. Cl. 340—172.5 23 Claims

ABSTRACT OF THE DISCLOSURE

A digital computer, having a control element comprising read/write control storage means loadable with precoded microinstructions from storage external to said computer to allow direct execution of macro instructions without compiling machine language; said control element also being loadable from main storage or from data register means within the computer to allow said computer to construct its own gating patterns, and rendering said computer restructurable.

This invention relates to electronic digital computers, and more particularly to the control element of electronic digital computers. The invention involves a digtal computer with the significant improvement of providing the programmer with complete dynamic control of the contents of the control element that is directing the functions of the computer.

Over the past several years great strides have been made in the development of electronic digital computers. Large scale digital computer systems have been developed which possess immense power enabling them to solve virtually any present day computing problem. However, the power of the system has been hampered by the difficulty of developing efficient programming systems.

The heart of any digital computing machine is the control element. Prior art control elements have been of the fixed type. That is, the control element operates the computing machine in precisely the same manner each time a computer program for the solving of a problem is run on the machine. These prior art control elements have evolved in stages. Originally, the control element was made by of various active and passive hardware components which were spread physically throughout a computing machine in an amorphous manner. More recently, with the advent of the concept of read-only control storage elements (ROCS), the control of many digital computing machines has become regularized and located in a central area within the machine. In prior art computers, an instruction set is made up of a fixed sequence of so-called primitive instructions which are fixed in the computing machine. The execution of each primitive instruction requires a number of so-called micro instructions which are fixed in ROCS to be executed within the machine. A so-called macro instruction, the type a programmer generally writes in a high level language such as Fortran, requires a number of the above-mentioned primitive instructions to be strung together and inserted in the system's main storage. Each primitive instruction is executed in turn, by the control storage by executing the micro instructions required for each particular primitive instruction. In such a system the prior art computer suffers from the disadvantage that for all of the myriad various macro functions that the computer may be called upon to perform, only a limited fixed set of instructions are available, so that even optimal sequences of instructions may represent an awkward and inefficient method of implementing the macro functions compared to that which could be achieved given free access to the micro instructions themselves.

It is therefore an object of the present invention to provide an improved computer system.

A particular object of this invention is to effect a control element for obtaining a better matching application of the operational problem to be solved to the digital computer.

A more specific object of this invention is to provide a control element for a digital computer which allows the machine to tailor itself to each new instruction to be executed.

A still more specific object of this invention is to achieve a control element for a digital computer which allows the programmer to modify machine control prior to or durińg program execution to enable the computer to restructure itself and provide a high level of efficiency in program execution.

A particular object of the present invention is to effect a control element for a digital computer with drastically improved control characteristics.

Another more particular object of the invention is to effect a control element for a digital computer which eliminates the need for the computer to have a prespecified instruction repertoire and renders the instruction repertoire universal.

Another and still more particular object of the invention is to effect a control element for a digital computer which allows the computer to construct its own gating patterns and to dynamically alter and optimize algorithms, information flow and data path bandwidths.

One feature of the invention comprises loadable, or read/write, control storage means in conjunction with an external control program storage device, used as a control element for a digitial computing machine.

The loadable or read/write control storage means may be disgnated as electronically changeable control storage (ECCS) inasmuch as the contents of the storage, used to control the machine circuitry, can be electronically modified prior to or during program execution. The control element may contain a conventional read-only control storage (ROCS) which allows the machine also to operate in the conventional fixed control manner when such operation is desired.

The basic digital computer can be any computer data paths, arithmetic, registers, and logical elements of a known type, but possessing the new control element described herein. An example of a known type of digital computer suitable for use with the control element described herein is seen in U.S. Patent No. 3,400,371 filed Apr. 6, 1964, and assigned to the assignee of the present invention.

The control element of the present invention contains micro instructions which operate the various circuits of the computer in sequences to allow execution of a computer program. Micro instructions in general might be viewed as gating patterns, and the manner in which they operate computer circuitry is explained in the above-referenced copending application. As mentioned above, micro instructions in conventional control means are fixed in ROCS. The control element of the present invention, however, comprises ECCS means and, if desired, ROCS means also. The micro instructions located in the ROCS of the present invention are fixed, but the micro instructions in the ECCS means are loadable. That is to say, the micro instructions in the ECCS means may be changed prior to or during program execution to facilitate efficient execution. Micro instructions are loadable into ECCS from any of several sources, including main storage, internal computer data flow, or external control program storage devices. This gives a digital computer flexibility to restructure or tailor itself to the task at hand.

In one type of operation, the programmer may, for example, write a micro program in a symbolic or functional language. The functional language comprises symbolic statements, for each of which statements micro instructions are prerecorded on an external control program storage device. The micro program would be loaded into the main storage of the computing machine in a manner similar to that of present day computers. However, instead of compiling the program as is done in present day computers, the micro instructions corresponding to the instructions of the symbolic language are located on the external control program storage device, read from said device into the ECCS means and executed to control machine function. The system may contain more than one ECCS so that the loading of oen can be overlapped in parallel with the execution of another to enhance time efficiency. In the presently described mode of operation the prior art requirement of program translation into a fixed intermediate machine language is eliminated and a digital computer is achieved which gives the user the ability to apply his micro instructions directly without the many fixed instruction programming steps required in present day computer systems.

As another feature of the invention, the ECCS means are loadable from main storage and also from the computer's data paths, as well as from the abovesaid external control program storage. Thus the system can be operated so as to construct its own gating patterns allowing the user to dynamically alter and optimize algorithms and information flow.

The foregoing and other objects, features and advantages of the invention will be apparent from the following more particular description of a preferred embodiment of the invention, as illustrated in the accompanying drawings.

GENERAL DESCRIPTION

As mentioned above, the control element of the present invention comprises ECCS means. Any number of ECCS means can be employed. However, the invention will be described, for illustrative purposes, as having two ECCS means.

Figure 1A:
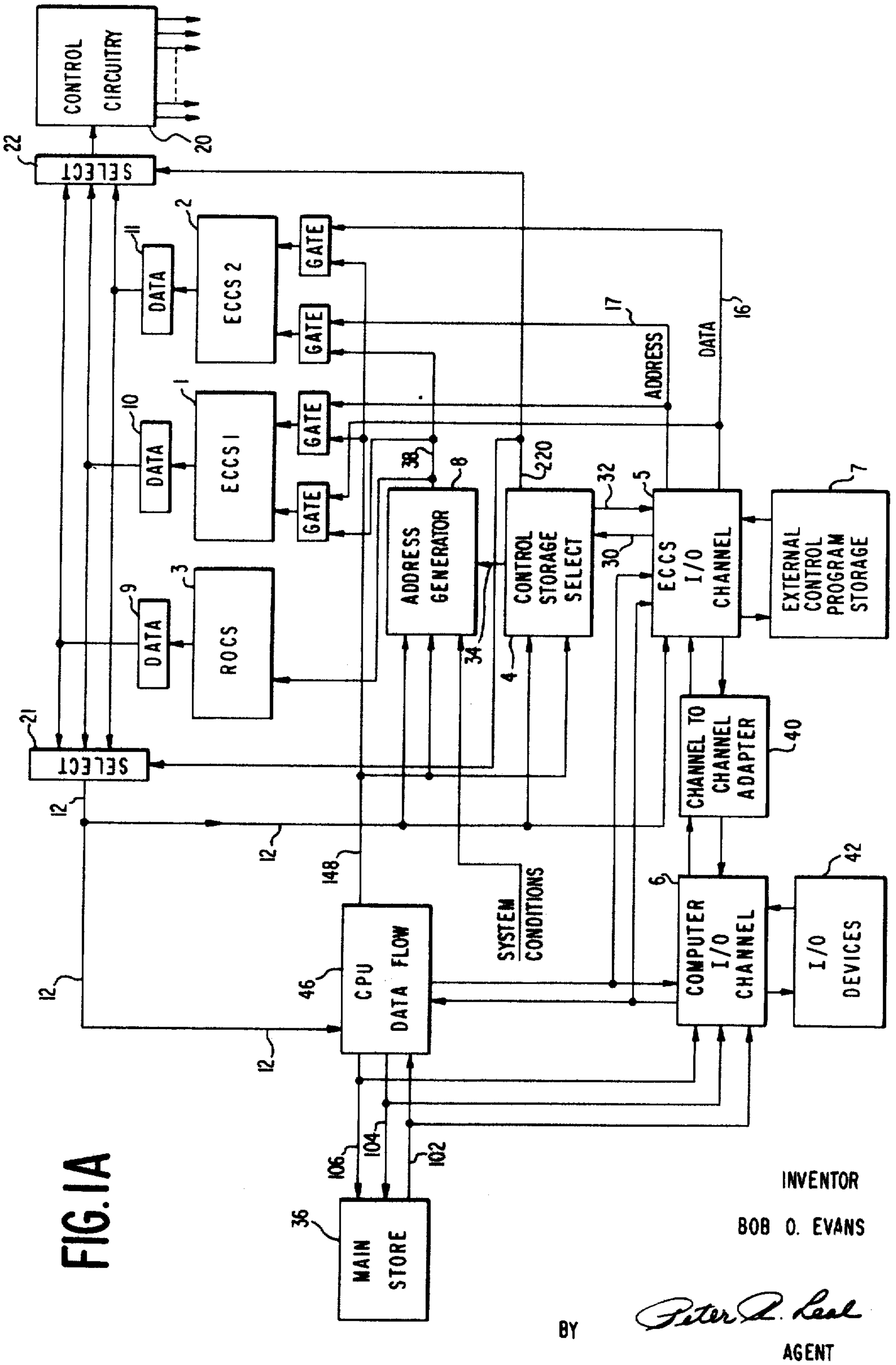
FIGURE 1A is a representation of a digital computer showing the basic control element of the present invention.

As seen in FIGURE 1A, the control element of the present invention comprises ECCS 1, ECCS 2, and ROCS 3, in conjunction with Control Storage Select 4, ECCS I/O, Channel 5, and External Control Program Storage 7. ECCS 1 and 2 are storage devices of the type well known in the art, the read/write speed of which is matched to the timing requirements of the digital computer. ECCS 1 and 2 might be, for example, well known core storage matrices or other appropriate read/write storage devices. ROCS 3 may be, for example, well known transformer or capacitor card read only storage devices. The control element is equipped with appropriate sequencing means such as Address Generator 8, which might be constructed such as that described in the above copending application, for locating, reading out and executing micro instructions.

ROCS, ECCS 1 and ECCS 2 each has an associated control storage register such as Data Register 9, 10, and 11, respectively. The output of any of Data Registers 9, 10, and 11, can be connected to Control Circuits 20 via Select circuitry 22. Select circuitry 22 may be, for example, AND gates enabled by a Data Out Select line 220. Likewise the output of any of Data Registers 9, 10 and 11 can be connected to ECCS I/O Channel 5 via Select circuitry 21 which is similar to Select circuitry 22 and similarly enabled by Data Out Select line 220.

Information read out of ROCS and ECCS enters Data Registers 9, 10, or 11 from which it can be used to generate a new address in Address Generator 8, or be used to supply control information to Control Storage Select 4 or ECCS I/O Channel 5. Gating patterns are derived from the micro instructions and are applied to Control Circuits 20 from Data Register 9, 10, or 11 via Select circuit 22 to establish information flow paths, sequence operations in other parts of the machine and determine future events in the scheme of control, as explained in the above-referenced copending application.

Main System Storage 36, also seen in FIGURE 1A can be any appropriate storage means such as a core plane storage. Macro instructions can be contained in individual cells or groups of cells of the Main System Storage.

Figure 1B:
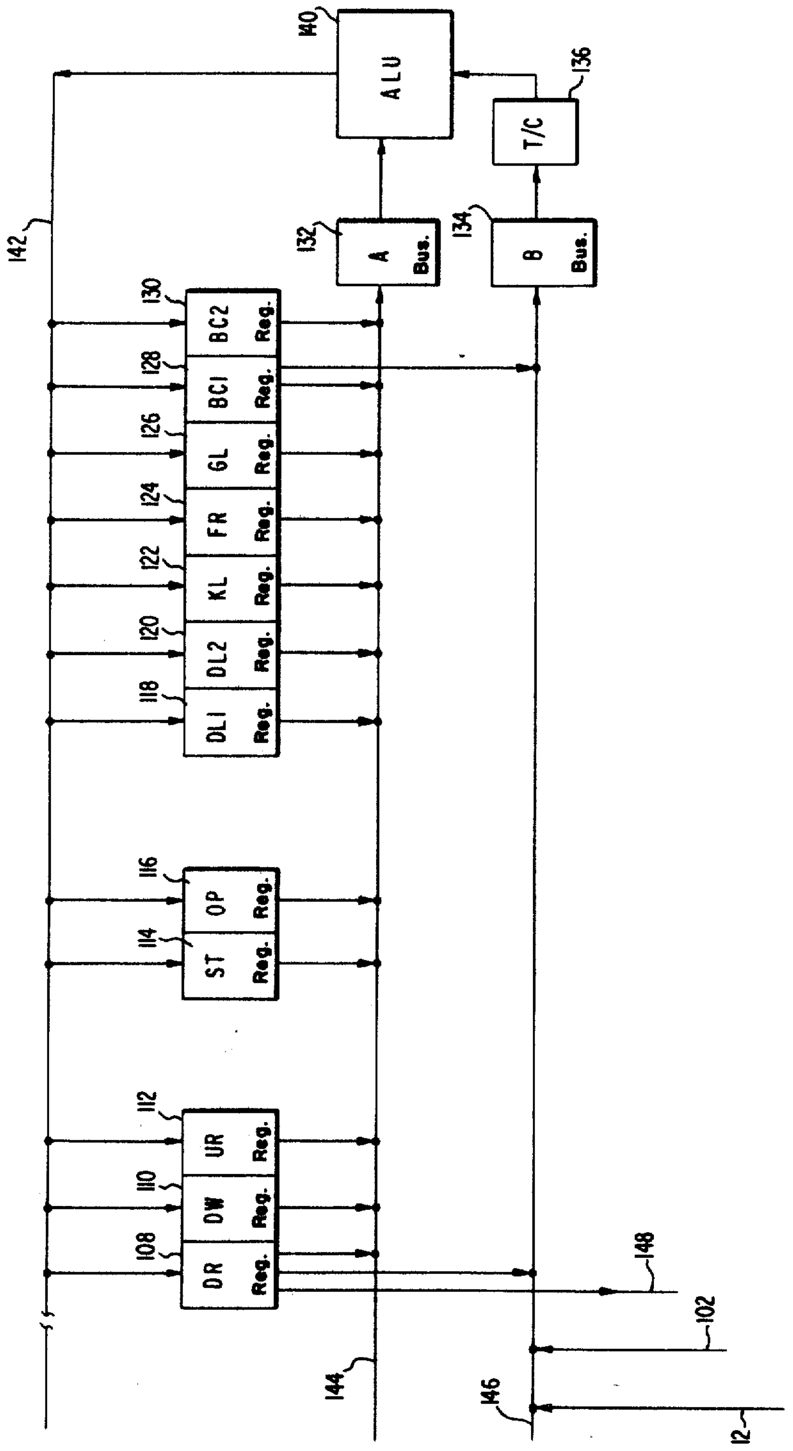
FIGURE 1B is a representation of the data flow of FIGURE 1A.

With reference to FIGURE 1B, other portions of the computer shown generally at Data Flow 46 in FIGURE 1A include general purpose registers 108 through 130 and arithmetic logic unit (ALU) 140. Data entry to the ALU 140 is via A bus 144 or B bus 146 by way of registers 132 and 134, respectively. The B bus is also provided with true/complement means 136. The output of the ALU is by way of bus 142 which has entries to each general purpose register, under control of the micro instructions executed from ECCS 1 and 2, and ROCS 3. Each general purpose register has an enty to the ALU via A bus 144, while registers 108 and 128 each have entries to the ALU via B bus 146. Output data can be supplied to external utilization devices 42 via Computer I/O Channel 6. Register 108 also has a data entry to Address Generator 8, Control Storage Select 4 and ECCS 1 and 2 via lines 148. In operation, the said registers, ALU, and described data paths operate under micro instruction control in a manner similar to the operation described in the above-referenced copending application.

ECCS I/O Channel 5 fonctions as an information transmission means between External Control Program Storage 7 and either of ECCS 1 or 2. A channel suitable for use might be, for example, one such as disclosed in U.S. Patent No. 3,411,144 filed Apr. 26, 1966 and assigned to the assignee of the present invention. Control Storage Select 4 receives mode information over line 148 or line 12 and sets up proper gating for appropriately requested ROCS and ECCS cycles to enable ECCS I/O Channel 5 to enter information into the proper ECCS. ECCS I/O Channel 5 serves to enable the transfer to ECCS 1 or 2 of information to be used as micro instructions under control of selection lines 224, 226 of FIGURE 1C, over line 16 to the proper address as designated on line 17. ECCS I/O Channel 5 may connect to various external control program storage devices 7, and may also establish a path to main storage 36 via Channel-to-Channel adapter 40 and Computer I/O Channel 6. The Channel-to-Channel Adapter 40 may be a suitable device such as that disclosed in copending application Ser. No. 432,970 filed Feb. 16, 1965 and assigned to the assignee of the present invention. Other means, well known to those skilled in the art may also be used to establish a data path between Main Storage 36 and ECCS 1 or 2.

Figure 1C:
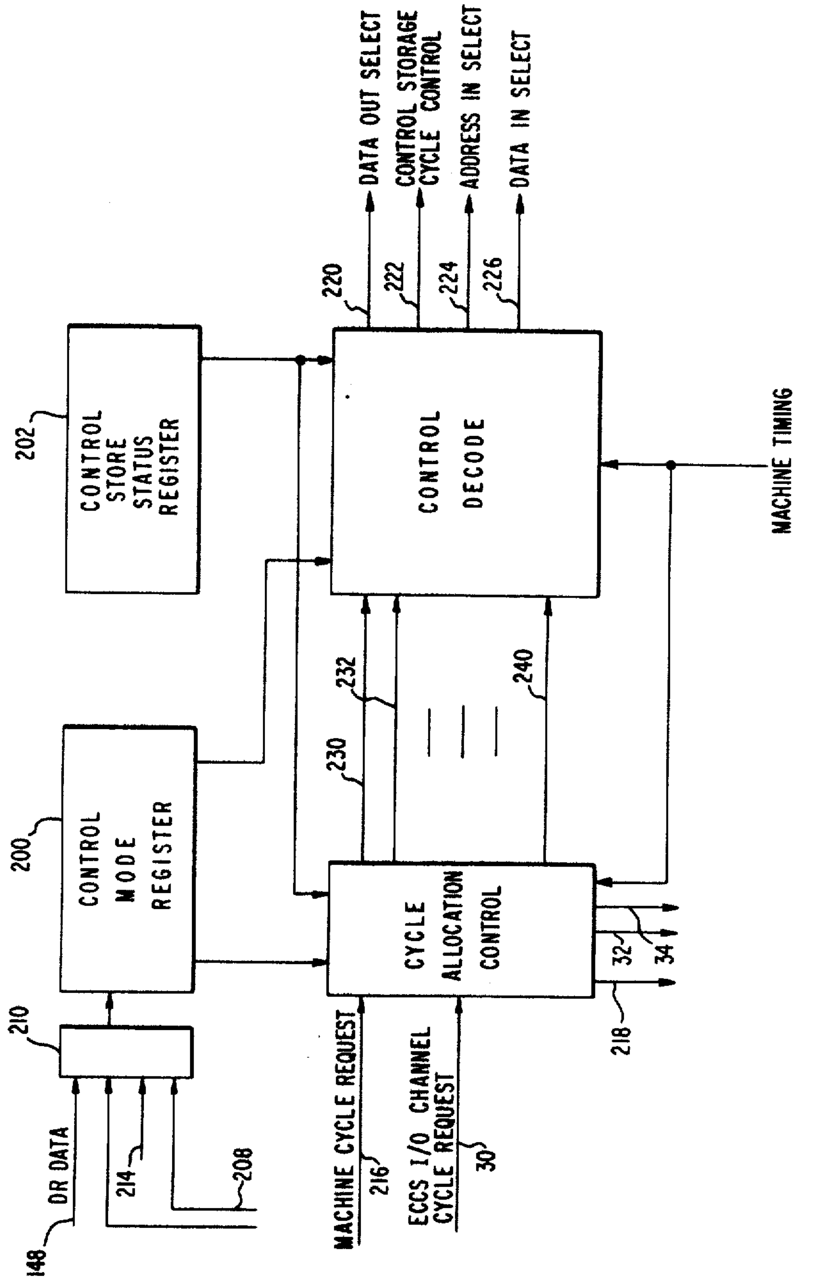
FIGURE 1C is an expression of the selection control seen in FIGURE 1A.

During program execution it may be desired to transfer information contained in the computer data flow 46 to ECCS 1 or 2 by lines 148 as controlled by selection lines 224, 226 of FIG. 1C.

Hence ECCS 1 or 2 are loadable from any of three sources (1) from Main System Storage 36 via Computer I/O Channel 6, Channel-to-Channel Adapter 40, and ECCS I/O Channel 5, or via any suitable means, well known to those skilled in the art, for establishing a data path; (2) from DR Register 108 via lines 148; (3) from External Control Program Storage 7 via ECCS I/O Channel 5.

FIGURE 1C shows the structure of Control Storage Select seen generally at 4 in FIGURE 1A. The Control Storage Select contains the registers and controls necessary to record the current mode of operation, establish the correct flow of data into and out of ECCS 1 and ECCS 2 by manipulation of registers and switch gate controls, and assign appropriate ECCS cycles in response to cycle requests from ECCS I/O Channel 5 and from machine clocking controls.

With continued reference to FIGURE 1C, the Control Storage Select comprises Control Mode Register 200, Control Store Status Register 202, Cycle Allocation Control 204 and Control Decode 206.

Control Mode Register 200 is capable of receiving data via gating means 210. Data can be entered from DR Register 108 over bus 148, or from the contents of a particular micro instruction field, reserved for mode information, over bus 214. The particular bus, 148 or 214, chosen is indicated by an enabling signal over Control Store Mode Select Control line 208. This line transmits a gating signal from a designated micro instruction field which causes the contents of either bus 148 or 214 to be entered into register 200.

Cycle Allocation Control 204, of a type well known in the computer art, has input lines 216 and 30 for Machine Cycle Request and for ECCS I/O Channel Cycle Request, respectively. The Machine Cycle Request line transmits a signal from the machine clocking controls requesting a new micro instruction. ECCS I/O Channel Request line 30 transmits a request from ECCS I/O Channel 5 to Cycle Allocation Control 204 for an input cycle. Machine Cycle Granted line 218 and ECCS I/O Channel Cycle Granted line 32 indicates to the internal machine controls and to ECCS I/O Channel, respectively, when requested cycles are initiated.

Cycle allocation information from Cycle Allocation Control 204 is also entered into Control Decode 206 over lines 230, 232, . . ., 240. Control Decode 206 is of a type well known in the art such as, for example, a matrix decode. Said Control Decode decodes the cycle allocation information and presents control gating signals over lines 220, 222, 224, and 226. Line 222 is designated Control Store Cycle Control and serves to initiate read or write cycles as appropriate from the currently active control stores. Line 20 is designated Data Out Select and serves to control the switching of information from the appropriate ECCS through Select means 21 or 22 to line 12 or to computer control circuitry 20, respectively. Address In Select line 224 controls the switching of Address Generator 8 and ECCS I/O Channel addresses to the appropriate ECCS via lines 30 and 17, respectively. Data In Select line 226 switches ECCS I/O data bus 17 to the appropriate ECCS.

In addition to the above described primary controls in Control Storage Select, there may be added well known controls necessary for establishing synchronism, monitoring the status of various system elements, as well as responding to exceptional conditions.

In operation, the contents of Control Mode Register 200 define the current mode of operation. Some possible modes are suggested on page 11 et. seq. The Control Store Status Register 202 records the current status of each store and indicates such conditions as whether a cycle is in progress, whether the desired ECCS is available, or busy. Cycle allocation Control 204 responds to cycle requests, analyzes current mode setting and status, and issues appropriate cycle information to Control Decode 206 from which information on lines 220, 222, 224, and 226 is derived.

OPERATION

As stated above, the purpose of the present invention is to provide a control element for a digital computer which enables the computer to restructure itself prior to or during program execution. Micro instructions for execution of macro instructions are executed from either ROCS, ECCS 1, or ECCS 2. The following are some of the possible operational modes of the control element.

In the ROCS mode of operation, ROCS 3 is used for control. Macro instructions may be read out of Main System Storage 36 and executed by means of micro instructions fixed in ROCS 3 in a manner explained in referenced copending application 357,372. Additionally, either ECCS 1 or ECCS 2 is available for block transfer of prerecorded micro instructions from Main Store 36 or External Control Program Storage 7 via I/O Channels 5 and 6, said micro instructions to be used for subsequent program execution of macro instructions. Further, either ECCS 1 or ECCS 2 may be loaded with micro instructions from DR Register 108 via lines 148. Micro instructions are loaded from any of the above three sources in parallel cycles with ROCS operation. Thus while instructions are being executed by ROCS, either of ECCS 1 or 2 may be setting up for subsequent instruction execution.

In another operational mode, either of ROCS or ECCS 1 may be used for control. Micro instructions may be read from either or both to effect execution of a program. During this time, ECCS 2 can be loaded from either External Control Program Storage, DR Register 108 or Main Store 36 in order to set up micro instructions for future execution.

As an example, during the time that program execution is being performed from ROCS or ECCS 1, an instruction to call a new control program into ECCS 2 may be read out of main store. ECCS I/O Channel 5 would then receive instructions to perform a read operation from the appropriate area of External Control Program Storage 7, thus loading ECCS 2 with the appropriate micro instruction under control of lines 222, 224, and 226. The micro instructions are subsequently read out of said ECCS 2 and applied as control information for the macro instruction statements to be executed at a later time. In this manner, for example, ECCS 1 and ECCS 2 can alternate in receiving the micro instructions for every other control program in a look-ahead fashion.

As another example of this mode of operation, it may be desirable to load information directly from Main Storage 36 into ECCS 2 while ECCS 1 or ROCS is executing so that said information can serve as micro instructions for subsequent program execution. In so doing, the word or words from main storage are transferred to Computer I/O Channel 6, through Channel-to-Channel Adapter 40 to ECCS I/O Channel 5 and thence into ECCS 2 for subsequent program execution.

In yet another example of a possible mode of operation, it may be desirable to generate mirco instructions from information contained in Main System Storage 36, or ROCS, or ECCS 1, and load the micro instructions into ECCS 2 for future execution. In this type of situation information would be read from Main System Storage, into the data-flow 46 via bus 102; or from ROCS, ECCS 1 or ECCS 2 via Data Registers 9, 10, or 11 respectively and bus 12; to bus 146 and then to the ALU 140 which would manipulate the information to generate the desired micro instructions. Upon generation, each micro instruction would be loaded into DR Register 108 from which it would be transferred via line 148 to ECCS 2 for subsequent execution.

In yet another mode of operation ROCS and ECCS 2 can be used to execute micro instructions for control. During this time ECCS 1 is available to be loaded with micro instructions from External Control Program Storage 7, Main System Storage 36, or DR Register 108 in a manner similar to that explained for ECCS 2 above.

In an extended mode operation, ROCS, ECCS 1 and ECCS 2 can be used in any desired order to execute micro instructions for control. In parallel cycles during which one or the other ECCS is executing micro instructions for control, the alternate ECCS can be available to be loaded with micro instructions in a manner similar to that described for ECCS 2 or ECCS 1 above.

SUMMARY

In summary, it can be seen that a control element for a digital computer has been provided which utilizes electronically changeable, or read/write, control storages. The control element thus provided enables the computer to restructure itself prior to or during program execution to allow the most efficient possible execution of the program instruction of the moment. Micro instructions necessary for the execution of individual macro instructions of a computer program are prerecorded on an External Control Program Storage device and can be loaded into the control element to be used for executing the macro instructions of the moment. Further, the use of loadable control storages allows the computer to generate its own micro instructions or gating patterns and to load these patterns into the control element for subsequent use in program execution. Additionally, means have been provided to load information, to be used as micro instructions, from main system storage into the control element, for subsequent use in program execution.

While the invention has been particularly shown and described with reference to a preferred embodiment thereof, it will be understood by those skilled in the art that various changes in form and details may be made therein without departing from the spirit and scope of the invention.

I claim:

1. In an electronic digital computer for executing electronic data processing tasks written in the form of a list of individual instruction statements, said computer including main storage means, input means, output means, general storage register means, arithmetic means, control means, control sequencing means and control circuitry, wherein the improvement is in said control means comprising:

control storage register means;

multiple read/write control storage means each having an input for receiving micro code necessary for the execution of said instruction statements, and an output connected to said control storage register means for applying said micro code to said control circuitry;

control program storage means external to said computer and having prerecorded thereon micro code necessary to execute said individual instruction statements;

switching and selection means having an input connected to said main storage means for receiving information for retrieving from said control program storage means said prerecorded instruction code corresponding to said instruction statements, said switching and selection means having an output buss connected to each of said multiple read/write control storage means for transferring said prerecorded micro code from said control program storage means to any of said multiple read/write control storage means.

2. An electronic digital computer according to the combination of claim 1, wherein said general storage register means has a data transmission buss connected to the input of each of said multiple read/write control storage means for enabling the transfer of information from said general storage register means to any of said multiple read/write control storage means.

3. An electronic digital computer according to the combination of claim 1, wherein said switching and selection means has an input connected to said main storage means for enabling said switching and selection means to transfer information from said main storage means over said output buss to any of said multiple read/write control storage means.

4. An electronic digital computer according to the combination of claim 1, wherein said control storage register means is connected to said general storage register means via said arithmetic means, for enabling the transfer of information from said control storage register means to said general storage register means.

5. An electronic digital computer according to the combination of claim 1, wherein said control storage register means is connected to said arithmetic means, for enabling the transfer of information from said control storage register means to said arithmetic means.

6. An electronic digital computer according to the combination of claim 1 wherein said control storage register means is connected to said arithmetic means for enabling the transfer of information from said control storage register means to said arithmetic means for manipulation therein;

said arithmetic means is connected to said general storage register means, for enabling transfer of said manipulated information from said arithmetic means to said general storage register means; and said general storage register means is connected to said multiple read/write control storage means, for enabling the transfer of said manipulated information from said general storage register means to any of said multiple read/write control storage means.

7. In an electronic digital computer for executing electronic data processing tasks written in the form of a list of individual instruction statements, said computer including main storage means, input means, output means, general storage register means, arithmetic means, control means, control sequencing means and control circuitry, wherein the improvement is in said control means comprising:

control storage register means;

single read/write control storage means having an input for receiving micro code necessary for the execution of said instruction statements, and having an output connected to said control storage register means for applying said micro code to said control circuitry;

control program storage means external to said computer and having prerecorder thereon micro code necessary to execute said individual instruction statements;

switching and selection means having an input connected to said main storage means for receiving information for retrieving from said control program storage means said prerecorded instruction code corresponding to said instruction statements, said switching and selection means having an output buss connected to said single read/write control storage means for transferring said prerecorded micro code from said control program storage means to said single read/write control storage means.

8. An electronic digital computer according to the combination of claim 7 wherein said general storage register means has a data transmission buss connected to the input of said single read/write control storage means for enabling the transfer of information from said general storage register means to said single read/write control storage means.

9. An electronic digital computer according to the combination of claim 7 wherein said switching and selection means has an input connected to said main storage means for enabling said switching and selection means to transfer information from said main storage means over said output buss to said single read/write control storage means.

10. An electronic digital computer according to the combination of claim 7, wherein said control storage register means is connected to said general storage register means via said arithmetic means, switching and selection means for enabling the transfer of information from said control storage register means to general storage register means.

11. An eletrconic digital computer according to the combination of claim 7, wherein said control storage register means is connected to said arithmetic means for enabling the transfer of information from said control storage means to said arithmetic means.

12. An electronic digital computer according to the combination of claim 7 wherein said control storage register means is connected to said arithmetic means for enabling the transfer of information from said control storage register means to said arithmetic means for manipulation therein;

said arithmetic means is ocnnected to said general storage register means, for enabling the transfer of said manipulated information from said arithmetic means to said general storage register means; and said general storage register means is connected to said single read/write control storage means, for enabling the transfer of said manipulated information from said general storage register means to said single read/write control storage means.

13. In an electronic digital computer for executing electronic data processing tasks written in the form of a list of individual instruction statements, said computer including main storage means, input means, output means, general storage register means, arithmetic means, control means, control sequencing means and control circuitry, wherein the improvement is in said control means comprising:

control storage register means;

read/write control storage means having an input for receiving micro code necessary for the execution of said instruction statements, and an output connected to control storage register means for applying said micro code to said control circuitry;

switching and selection means having an input connected to said main storage means for receiving information to be used as micro code corresponding to said instruction statements, said switching and selection means having an output buss connected to said read/write control storage means for transferring said micro code from said main storage means to said read/write control storage means.

14. An electronic digital computer according to the combination of claim 13 wherein said general storage register means has a data transmission buss connected to the input of said read/write control storage means for enabling the transfer of information from said general storage means to said read/write control storage means.

15. An electronic digital computer according to the combination of claim 13, wherein said control storage register means is connected to said general storage register means by said arithmetic means, for enabling the transfer of information from said control storage register means to said general storage register means.

16. An electronic digital computer according to the combination of claim 13 wherein said control storage register means is connected to said arithmetic means, for enabling the transfer of information from said control storage register means to said arithmetic means.

17. An electronic digital computer according to the combination of claim 13 wherein said control storage register means is connected to said arithmetic means for enabling the transfer of information from said control storage register means to said arithmetic means for manipulation therein;

said arithmetic means is connected to said general storage register means, or enabling transfer of said manipulated information from said arithmetic means to said general storage register means; and said general storage register means is connected to said read/write control storage means, for enabling the transfer of said manipulated information from said general storage register means to said read/write control storage means.

18. In an electronic digital computer for executing electronic data processing tasks written in the form of a list of individual instruction statements, said computer including main storage means, input means, output means, general storage register means, arithmetic means, control means, control sequencing means, and control circuitry, wherein the improvement is in said control means comprising:

control storage register means;

read-only control storage means containing micro code necessary for the execution of said instruction statements and having an output connected to said control storage register means for applying said micro code to said control circuitry;

read/write control storage means having an input for receiving micro code necessary for the execution of said instruction statements and having an output connected to said control storage register means for applying said micro code to said control circuitry;

control program storage means external to said computer and having prerecorded thereon micro code necessary to execute said individual instruction statements;

switching and selection means having an input connected to said main storage means for receiving information for retrieving from said control program storage means said prerecorded instruction code corresponding to said instruction statements, said switching and selection means having an output buss connected to said read/write control storage means for transferring said prerecorded micro code from said control program storage means to said read/write control storage means.

19. An electronic digital computer according to the combination of claim 18, wherein said general storage register means has a data transmission buss connected to the input of said read/write control means for enabling the transfer of information from said general storage register means to said read/write control storage means.

20. An electronic digital computer according to the combination of claim 18, wherein said switching and selection means have an input connected to said main storage means for enabling said switching and selection means to transfer information from said main storage means over said output buss to said read/write control storage means.

21. An electronic digital computer according to the combination of claim 18, wherein said control storage register means is connected to said general storage register means via said arithmetic means for enabling the transfer of information from said control storage register means to said general storage register means.

22. An electronic digital computer according to the combination of claim 18, wherein said control storage register means is connected to said arithmetic means, for enabling the transfer of information from said control storage register means to said arithmetic means.

23. An electronic digital computer according to the combination of claim 18 wherein said control storage register means is connected to said arithmetic means for enabling the transfer of information from said control storage register means to said arithmetic means for manipulation therein;

said arithmetic means is connected to said general storage register means, for enabling the transfer of said manipulated information from said arithmetic means to said general storage register means; and said general storage register means is connected to said read/write control storage for enabling the transfer of said manipulated information from said general storage register means to said read/write control storage means.

References Cited

UNITED STATES PATENTS

| | | | |
|---|---|---|---|
| 3,258,748 | 6/1966 | Schneberger et al. | 340—127.5 |
| 3,281,792 | 10/1966 | Raymond | 340—172.5 |
| 3,315,235 | 4/1967 | Carnevale et al. | 340—172.5 |
| 3,325,788 | 6/1967 | Hackl | 340—172.5 |
| 3,343,141 | 9/1967 | Hackl | 340—172.5 |
| 3,345,611 | 10/1967 | Tachus | 340—172.5 |
| 3,391,394 | 7/1968 | Ottaway et al. | 340—172.5 |
| 3,400,371 | 9/1968 | Amdahl et al. | 340—172.5 |

JOHN P. VANDENBURG, Primary Examiner

PO-1050
(5/69)

UNITED STATES PATENT OFFICE
CERTIFICATE OF CORRECTION

Patent No. 3,478,322 Dated November 11, 1969

Inventor(s) B. O. Evans

It is certified that error appears in the above-identified patent and that said Letters Patent are hereby corrected as shown below:

Column 3, line 17 "oen" should read --one--.

Column 4, line 38 "fonctions" should read --functions--.

Column 6, line 52 "or ROCS, or ECCS 1," should read --or ROCS, or ECCS 1, or ECCS 2--.

Column 9, line 12 "ocnnected" should read --connected--;
line 70 "means, or" should read --means for--.

Signed and sealed this 20th day of April 1971.

(SEAL)
Attest:

EDWARD M.FLETCHER,JR.
Attesting Officer

WILLIAM E. SCHUYLER, JR.
Commissioner of Patents